United States Patent
Zhu et al.

(10) Patent No.: US 12,420,780 B2
(45) Date of Patent: Sep. 23, 2025

(54) VEHICULAR DRIVING ASSIST SYSTEM USING RADAR SENSORS AND CAMERAS

(71) Applicant: Magna Electronics Inc., Auburn Hills, MI (US)

(72) Inventors: Jingyu Zhu, Rochester Hills, MI (US); Tejas Murlidhar Varunjikar, Troy, MI (US); Harold E. Joseph, Brampton (CA)

(73) Assignee: Magna Electronics Inc., Auburn Hills, MI (US)

( * ) Notice: Subject to any disclaimer, the term of this patent is extended or adjusted under 35 U.S.C. 154(b) by 226 days.

(21) Appl. No.: 18/339,404

(22) Filed: Jun. 22, 2023

(65) Prior Publication Data

US 2023/0415734 A1 Dec. 28, 2023

Related U.S. Application Data

(60) Provisional application No. 63/366,863, filed on Jun. 23, 2022.

(51) Int. Cl.
| | |
|---|---|
| *B60W 30/09* | (2012.01) |
| *B60W 30/095* | (2012.01) |
| *B60W 50/14* | (2020.01) |
| *G01S 13/86* | (2006.01) |
| *G01S 13/931* | (2020.01) |

(52) U.S. Cl.
CPC .......... *B60W 30/09* (2013.01); *B60W 30/095* (2013.01); *B60W 50/14* (2013.01); *G01S 13/867* (2013.01); *G01S 13/931* (2013.01); *B60W 2420/403* (2013.01); *B60W 2420/408* (2024.01); *B60W 2554/00* (2020.02); *G01S 2013/9315* (2020.01); *G01S 2013/9318* (2020.01); *G01S 2013/93185* (2020.01); *G01S 2013/9319* (2020.01); *G01S 2013/93272* (2020.01); *G01S 2013/93274* (2020.01)

(58) Field of Classification Search
CPC ...................................................... B60W 30/09
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 8,013,780 | B2 | 9/2011 | Lynam |

(Continued)

*Primary Examiner* — Michael A Berns
(74) *Attorney, Agent, or Firm* — HONIGMAN LLP

(57) ABSTRACT

A vehicular driving assist system includes a plurality of radar sensors and a plurality of cameras. The system, while the vehicle is travelling along a road and responsive to processing of sensor data captured by the radar sensors, is operable to determine presence of an object in an adjacent zone or in a rear zone. The system confirms presence of the object via processing captured image data. Responsive to determining and confirming presence of the object in the adjacent zone, the system determines a collision risk based on proximity of the object and vehicle. Responsive to determining and confirming presence of the object in the rear zone, the system determines the collision risk based on an estimated time to collision of the object and vehicle.

35 Claims, 4 Drawing Sheets

(56) References Cited

U.S. PATENT DOCUMENTS

| | | | |
|---|---|---|---|
| 8,027,029 B2 | 9/2011 | Lu et al. | |
| 9,146,898 B2 | 9/2015 | Ihlenburg et al. | |
| 9,260,095 B2 | 2/2016 | Chundrlik, Jr. et al. | |
| 9,327,693 B2 | 5/2016 | Wolf | |
| 9,545,911 B2 * | 1/2017 | Kim | B60W 10/184 |
| 9,761,142 B2 | 9/2017 | Pflug | |
| 9,925,980 B2 | 3/2018 | Edo Ros | |
| 10,071,687 B2 | 9/2018 | Ihlenburg et al. | |
| 10,099,614 B2 | 10/2018 | Diessner | |
| 10,866,306 B2 | 12/2020 | Maher et al. | |
| 12,071,150 B2 * | 8/2024 | Cordeiro | B60W 50/14 |
| 12,286,059 B2 * | 4/2025 | Skrocki | B60R 1/22 |
| 2023/0032998 A1 | 2/2023 | Kushwaha et al. | |
| 2023/0415734 A1 * | 12/2023 | Zhu | G01S 13/867 |
| 2024/0059282 A1 * | 2/2024 | Prasad Challa | B60W 30/18154 |
| 2024/0317256 A1 * | 9/2024 | Kim | B60W 60/001 |

* cited by examiner

VEHICULAR DRIVING ASSIST SYSTEM USING RADAR SENSORS AND CAMERAS

CROSS REFERENCE TO RELATED APPLICATION

The present application claims the filing benefits of U.S. provisional application Ser. No. 63/366,863, filed Jun. 23, 2022, which is hereby incorporated herein by reference in its entirety.

FIELD OF THE INVENTION

The present invention relates generally to a vehicular sensing system for a vehicle and, more particularly, to a vehicular sensing system that utilizes multiple sensors at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A driving assistance system or vehicular alert system for a vehicle utilizes one or more cameras (preferably one or more CMOS cameras) to capture image data representative of images exterior of the vehicle and one or more radar sensors to capture sensor data of objects surrounding the vehicle, and provides a blind spot monitoring and response system that utilizes sensor data captured by radar sensors and image data captured by surround view cameras disposed at the vehicle to determine presence of objects proximate the equipped vehicle.

For example, a vehicular alert system includes a plurality of radar sensors disposed at the vehicle and sensing exterior of the vehicle, the radar sensors capturing sensor data. The plurality of radar sensors may include a forward sensing radar sensor and a rearward sensing radar sensor. The system includes a plurality of cameras disposed at the vehicle and viewing exterior of the vehicle, the cameras capturing image data. The cameras may include CMOS imaging arrays that include at least one million photosensors arranged in rows and columns. The plurality of cameras may be part of a surround view vision system (SVS) of the vehicle and include at least a driver-side rearward viewing camera, a passenger-side sideward viewing camera, and (iii) a rearward viewing camera. An electronic control unit (ECU) includes electronic circuitry and associated software, the electronic circuitry includes a processor for processing sensor data captured by the radar sensors to detect presence of objects in a field of view of the radar sensors and an image processor for processing image data captured by the cameras to detect presence of objects in fields of view of the cameras. While the vehicle is travelling along a traffic lane along a road and responsive to processing at the ECU of sensor data captured by the radar sensors, the system (i) determines presence of an object in an adjacent zone, the adjacent zone extending along a side of the equipped vehicle and for a first distance rearward of the equipped vehicle, or (iii) determines presence of the object in a rear zone, the rear zone extending along the side of the equipped vehicle and for a second distance greater than the first distance rearward of the equipped vehicle. Responsive to determining presence of the object and via processing at the ECU of image data captured by at least one camera, the system confirms presence of the object. Responsive to confirming presence of the object, the system is operable to determine a degree of collision risk between the equipped vehicle and the object. Responsive to determining presence of the object in the adjacent zone, the system determines the degree of collision risk based on a determined proximity of the object to the equipped vehicle. Responsive to determining presence of the object in the rear zone, the system determines the degree of collision risk based on a determined time to collision (TTC) of the object relative to the equipped vehicle. Responsive to determining that the degree of collision risk is above a threshold collision risk, the system communicates an alert to a driver of the equipped vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images or sensor data exterior of the vehicle and may process the captured image data or sensor data to display images and to detect objects at or near the vehicle and in the predicted path of the vehicle, such as to assist a driver of the vehicle in determining whether the detected object is a threat. The vision system includes a processor or image processor or image processing system that is operable to receive image data or sensor data from one or more cameras or sensors. Optionally, the system may provide an output to a display device for displaying images representative of the captured image data. Optionally, the vision system may provide display, such as a rearview display or a top down or bird's eye or surround view display or the like.

Figure 1:
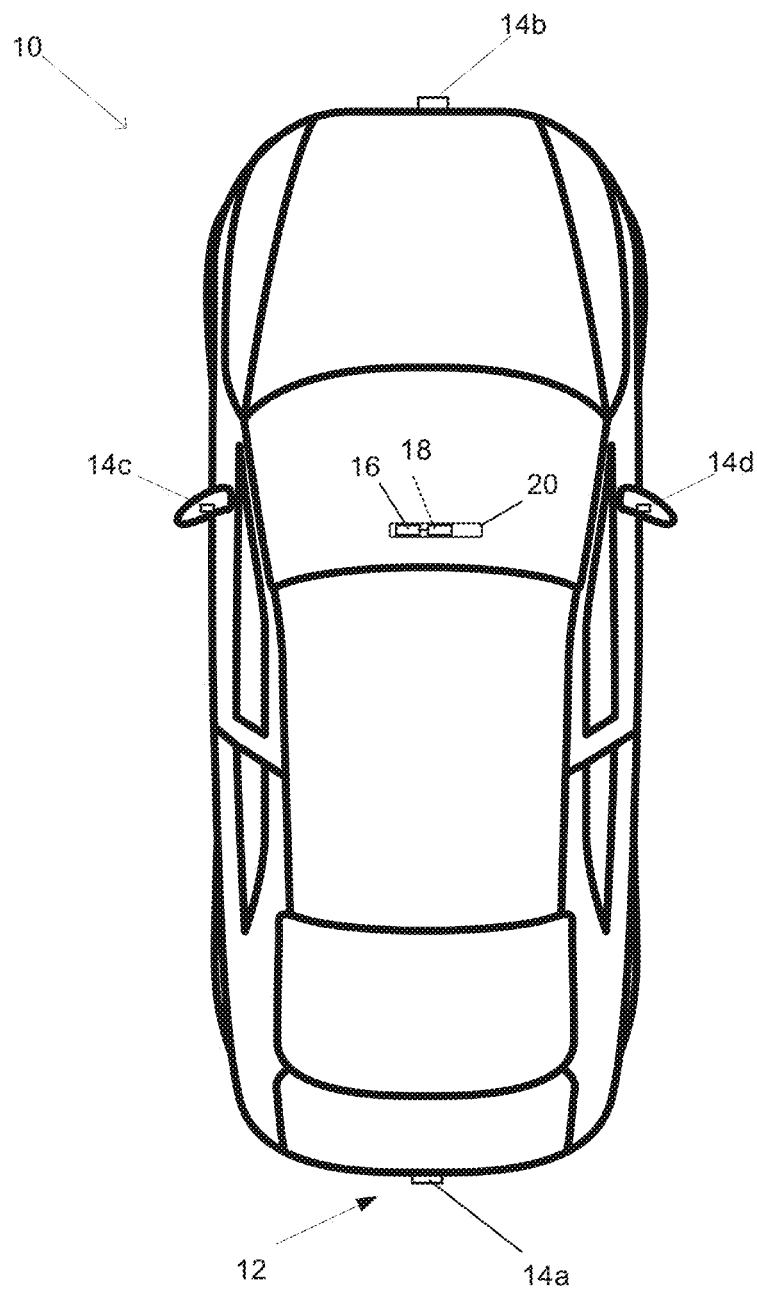
FIG. 1 is a plan view of a vehicle equipped with a vehicular alert system.

Referring now to the drawings and the illustrative embodiments depicted therein, a vehicle 10 includes an imaging system or vision system or alert system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Advanced Driver Assistance Systems (ADAS) may obtain information about the surrounding environment through different sensors such as cameras, radar, and lidar. This information is used by various features (e.g., adaptive cruise control, lane centering systems, blind spot monitoring systems, and the like) to assist the driver while driving or operating a vehicle. Further, these ADAS features may use information and/or captured sensor data to detect potential threats around the vehicle (e.g., another vehicle or object near the equipped vehicle or in the path of travel of the equipped vehicle that poses a threat of collision to the equipped vehicle), and generate warnings for the driver about the potential threats around the vehicle.

The system 12 observes or monitors (such as active or passive monitoring) left and right areas adjacent the equipped vehicle (e.g., blind spots) and alerts the driver about objects in the blind spots or fast-approaching objects from behind the equipped vehicle. This ensures the safety of the driver and/or passenger inside the equipped vehicle and other road users by warning the driver against changing lanes when it is not safe to do so. For example, the vehicle 10 is equipped with a blind spot monitoring system (BSM) that includes one or more radar sensors disposed at the vehicle and sensing exterior of the vehicle, and a surround view vision system (SVS) or monitoring system that includes one or more cameras disposed at the vehicle and viewing exterior of the vehicle. The BSM may monitor regions exterior the vehicle to determine presence of objects and/or other vehicles in the regions exterior and near the equipped vehicle. That is, the BSM processes sensor data captured by the radar sensors and representative of the blind spot regions along the respective sides of the vehicle to detect objects present in the blind spot regions. The SVS may capture and process image data to display images to the driver of the vehicle representative of a field of view around the vehicle, such as a 360 degree or bird's eye or top down view, and to determine presence of objects within the fields of view of the one or more cameras.

The vehicular alert system 12 may process sensor data captured by the BSM radar sensors and/or image data captured by the SVS cameras to determine or predict presence of objects and vehicles in regions adjacent to and rear of the equipped vehicle and/or approaching the regions adjacent to the equipped vehicle. When presence of an object or another vehicle is determined in the region or approaching the region adjacent to the vehicle, the vehicular alert system 12 issues a warning to the driver of the vehicle and, optionally, adjusts control of the vehicle to avoid a potential collision with the other vehicle. The use of captured radar sensor data and captured image data to determine presence of objects increases the total coverage area surrounding the vehicle, improves accuracy of detection, and decreases false detections. Additionally, due to the use of multiple sensor types, the system may remain operational during a variety of different weather conditions that may be unfavorable to one or the other of the radar or imaging sensors.

Figure 2:
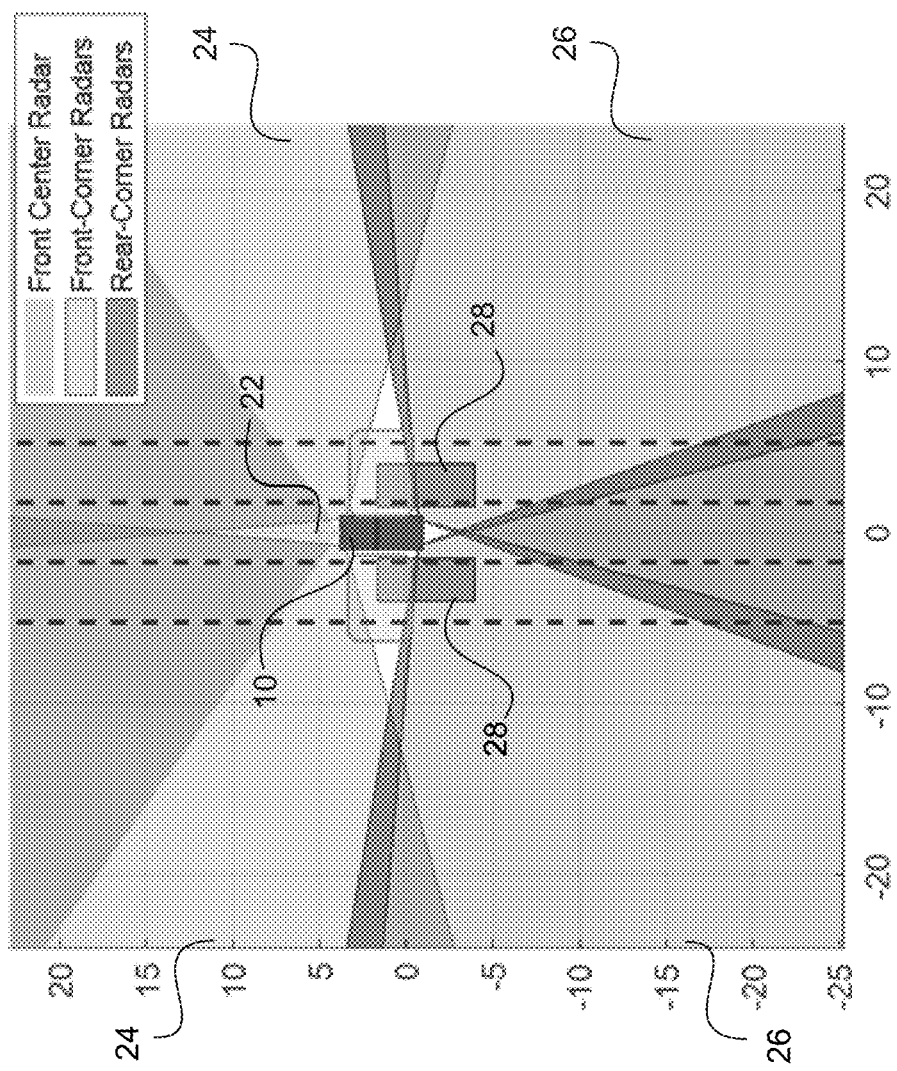
FIG. 2 is a diagram showing the fields of sensing of radar sensors mounted at the vehicle.

As shown in FIG. 2, the vehicle 10 is equipped with a plurality of radar sensors, such as a front-center radar sensor sensing a front-center region 22 forward of the vehicle 10, front-corner radar sensors each respectively sensing a front-corner region 24 forward and partially along a respective side of the vehicle 10, and rear-corner radar sensors each respectively sensing a rear-corner region 26 rearward and partially along a respective side of the vehicle 10. That is, a driver-side front corner radar sensor may sense at least forward of the vehicle and at least partially along a driver side of the vehicle, a passenger-side front corner radar sensor may sense at least forward of the vehicle and at least partially along a passenger side of the vehicle, a driver-side rear corner radar sensor may sense at least rearward of the vehicle and at least partially along the driver side, and a passenger-side rear corner radar sensor may sense at least rearward of the vehicle and at least partially along the passenger side.

Respective rear blind spot regions 28 extend immediately adjacent to the respective sides of the vehicle and rearward of the vehicle. For example, the blind spot regions 28 may comprise regions that are not viewable by the driver of the vehicle (e.g., not viewable by the driver of the vehicle when viewing through the windshield or side windows of the vehicle or when viewing an exterior rearview mirror of the vehicle). The front-center region 22, the respective front-corner regions 24 and the respective rear-corner regions 26 may correspond to a significant portion of the environment surrounding the vehicle 10, but may not include at least a portion of the blind spot regions 28. That is, the total field of view of the plurality of radar sensors disposed at the vehicle may not include at least a portion of the blind spot regions 28 along the respective sides of the vehicle 10.

Cameras of the SVS system may have fields of view that include at least portions of the blind spot regions 28. For example, the driver-side sideward viewing camera 14*c* may view at least sideward of the vehicle along the driver side (and at least partially forward or rearward of the vehicle) to view at least a portion of a blind spot region 28 between the driver-side front corner and rear corner radar sensors. The passenger-side sideward viewing camera 14*d* may view at least sideward of the vehicle along the passenger side (and at least partially forward or rearward of the vehicle) to view at least a portion of a blind spot region 28 between the passenger-side front corner and rear corner radar sensors. Thus, image data captured by the SVS cameras disposed at the vehicle 10 may also be used by the system 12 to determine presence of vehicles and objects surrounding the vehicle, such as within the blind spot regions 28, or to confirm or supplement the determined presence of objects using radar sensor data.

In other words, even with front and rear corner radar sensors mounted on the vehicle, the BSM radar sensors of the equipped vehicle may not have enough coverage to detect smaller vehicles and objects adjacent the equipped vehicle (e.g., inside the blind zone). The field of sensing of the radar sensors, as well as the mounting angle of the sensors, is influenced by several factors and may not provide the desired coverage adjacent the vehicle. It is important to have enough coverage around the equipped vehicle, especially adjacent zones that the driver does not usually monitor (e.g., blind spots). Thus, the SVS may help identify traffic objects (cars, motorcycles, and the like) adjacent to the equipped vehicle. The SVS, or other multi-camera systems, may be used to provide a high resolution, 360 degree field of view around the vehicle for driver convenience and the image data may be further used for identifying objects of interest such as traffic vehicles in adjacent lanes and the like.

When the vehicle 10 is travelling along a roadway, such as along a traffic lane of the roadway, the system 12 processes sensor data captured by the radar sensors and/or image data captured by the cameras to monitor one or more regions along both sides of the vehicle and in a rearward direction of the vehicle, so that if an object or vehicle is determined or predicted to be present in one or more of the regions, the system may communicate a signal or alert to the driver and/or adjust control of the vehicle to avoid or mitigate a collision or reduce the chance of a collision with the object or other vehicle. Further, if the driver begins changing lanes or indicates an intention to change lanes toward the one or more regions and the detected vehicle, such that the determined or predicted presence of the other vehicle poses a threat of collision to the equipped vehicle, the system may further alert the driver or perform a corrective driving maneuver to avoid the collision or reduce the threat of the collision.

Figure 3:
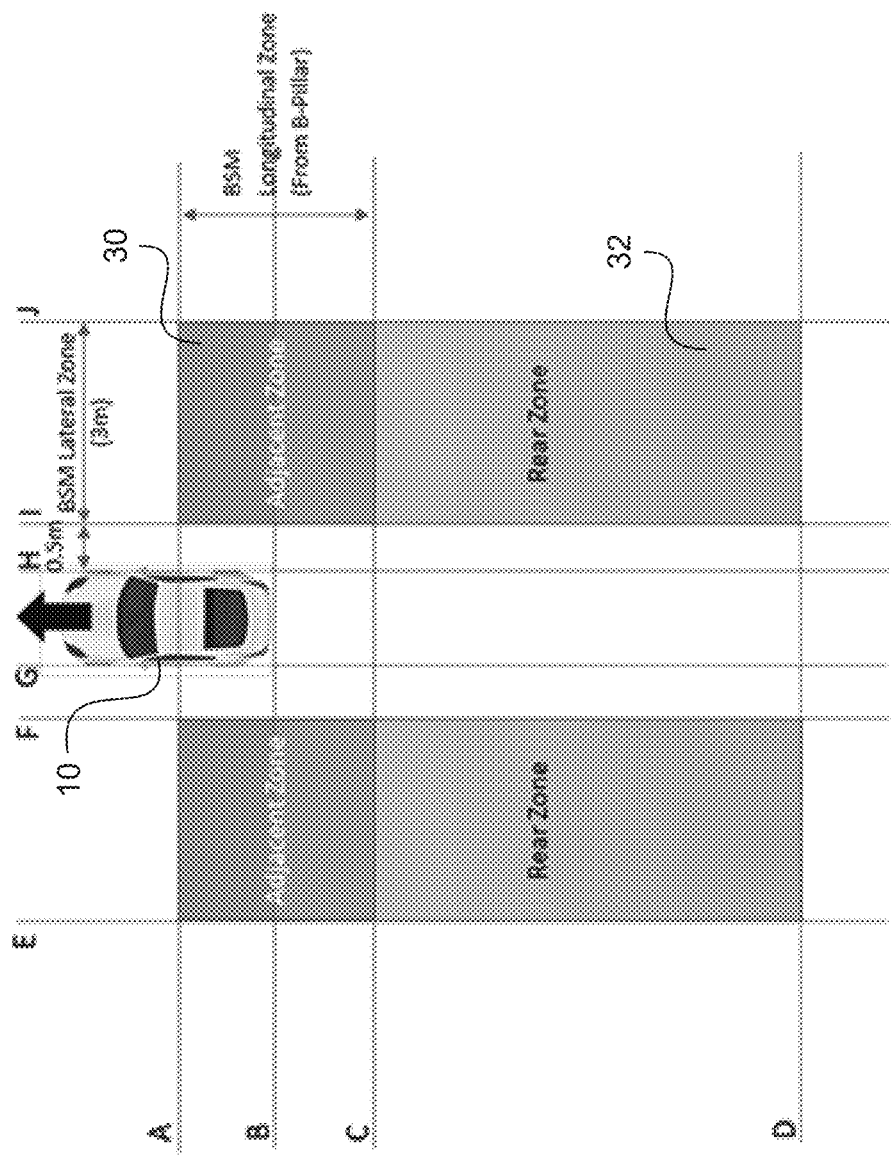
FIG. 3 is a diagram showing zones in adjacent traffic lanes that are monitored by the alert system to identify potential threats to the vehicle.

For example, and as shown in FIG. 3, the system 12 may monitor respective first or adjacent zones 30 extending along the respective sides of the vehicle and for a distance rearward of the vehicle 10, and respective second or rear zones 32 extending along the respective sides of the vehicle and extending for a further distance rearward of the vehicle. Based on detecting presence of the other vehicle in one of the adjacent zones 30 or one of the rear zones 32, the other vehicle may be identified as a threat so that the driver may be alerted or corrective driving action taken based on the threat. For example, when presence of a vehicle or object is determined or predicted within one of the adjacent zones 30, the determined vehicle or object may be identified as a threat and the appropriate alert or corrective maneuver may be issued. When presence of a vehicle or object is determined or predicted within one of the rear zones 32 and the determined vehicle or object is determined to be approaching the equipped vehicle 10, a time to collision (TTC) of the equipped vehicle 10 and the determined vehicle or object may be determined and, based on the TTC, the other vehicle may be identified as a threat. That is, the system 12 determines or estimates a time for the determined vehicle or object to collide with or contact or come within a threshold distance of the equipped vehicle to determine or estimate the TTC, where the TTC may be determined or estimated based at least in part on the current path of travel of the equipped vehicle 10, a determined or estimated path of travel of the detected vehicle or object, and a relative velocity of the determined vehicle or object relative to the equipped vehicle 10. The other vehicle may be identified as a threat when the TTC is less than a threshold TTC, such as when the TTC is less than 3.5 seconds, less than 2 seconds, less than 1 second and the like.

The adjacent zones 30 may be any suitable size and distance from the vehicle to identify or predict immediate threats to the equipped vehicle. For example, the adjacent zones 30 may start at the B-pillar of the equipped vehicle and extend to a distance behind the vehicle (e.g., 5 meters or more, 6 meters or more, 10 meters or more and the like). Laterally, the adjacent zones 30 may start from a short distance away from the outside edge of the vehicle (e.g., 0 meters, 0.5 meters or less, 1 meter or less and the like) and extend to include a width (e.g., 2 meters or more, 3 meters or more, 5 meters or more and the like) that is calibratable based on, for example, a desired sensitivity of the system or a known or measured lane width of the roadway.

The rear zones 32 may be any suitable size and distance from the vehicle to identify potential threats to the equipped vehicle. For example, the rear zones 32 may start from the rear bumper of the equipped vehicle 10 and extend rearward of the vehicle to include any suitable range that is supported by the radar sensors and/or cameras at the vehicle (e.g., 10 meters or more, 20 meters or more, 30 meters or more and the like). Laterally, the rear zones 32 may start from a short distance away from the outside edge of the vehicle (e.g., 0 meters, 0.5 meters or less, 1 meter or less and the like) and extend to include a width (e.g., 2 meters or more, 3 meters or more, 5 meters or more and the like) that is calibratable. Thus, the adjacent zones 30 and the rear zones may at least partially overlap.

Presence of another vehicle or object within one or more of the adjacent zones 30 or rear zones 32 may be initially detected via processing of sensor data captured by the radar sensors disposed at the vehicle. That is, the system may perform passive monitoring of the adjacent zones 30 and rear zones 32 by processing sensor data captured by the front corner and/or rear corner radar sensors to detect presence of objects or other vehicles. After initially detecting presence of the other vehicle or object, the system 12 may process image data captured by the SVS cameras disposed at the vehicle, such as to confirm presence of the detected vehicle or object within the adjacent zones 30 or rear zones 32 or to provide continuous monitoring of the detected vehicle or object as the detected vehicle or object moves between fields of sensing of the radar sensors and fields of view of the cameras.

Based on confirmed presence of the other vehicle or object, the system may determine a degree of collision risk between the equipped vehicle and the detected vehicle or object. For example, if the detected vehicle is in one of the adjacent zones 30, the system may sense or determine a proximity of the detected vehicle to the equipped vehicle to determine the degree of collision risk. The determined degree of collision risk may be higher if the detected vehicle is in closer proximity to the equipped vehicle than if the detected vehicle is further from the equipped vehicle. If the detected vehicle is in one of the rear zones 32, the system may determine the TTC of the detected vehicle to the equipped vehicle to determine the degree of collision risk. A shorter TTC may correspond to a greater degree of collision risk.

Based on the determined degree of risk (such as based on whether the degree of risk satisfies a threshold), the system issues the appropriate alert or performs a corrective driving maneuver. That is, when the system determines that a detected vehicle poses a degree of risk above a threshold degree of risk, the system may identify the detected vehicle as a threat. For example, the collision risk associated with the detected vehicle may satisfy the risk threshold based on the detected vehicle being within a threshold proximity of the equipped vehicle (e.g., one meter or less, two meters or less, five meters or less and the like) or based on the TTC being below a threshold TTC (e.g., one second or less, two seconds or less, five seconds or less and the like). The system may generate an alert for the driver of the vehicle based on the collision risk satisfying a first threshold and the system may perform a corrective driving maneuver based on the collision risk satisfying a second threshold.

Thus, while the vehicle is travelling along the roadway, the system 12 may process sensor data captured by the one or more radar sensors (e.g., the front corner radar sensors and/or the rear corner radar sensors) and determine presence of another vehicle or object in an adjacent zone 30 and/or a rear zone 32. When presence of the other vehicle or object is determined in the adjacent zone 30, the other vehicle may be identified as a threat (i.e., the system may determine that a threat is present in the adjacent zone) because, if the equipped vehicle were to change lanes or move laterally into or toward the adjacent zone 30, a collision between the equipped vehicle and the other vehicle or object would be likely to occur. The threat may be determined based on a determined proximity of the detected vehicle being closer than a threshold proximity (e.g., 2 meters or less, 1 meter or less, 0.5 meters or less and the like). The determined proximity (e.g., a lateral distance and/or a longitudinal distance of the detected vehicle from the equipped vehicle) may be determined via processing of sensor data captured by the radar sensors and/or image data captured by the SVS cameras.

Presence of the other vehicle in the adjacent zone 30 may be confirmed, or a more precise position of the other vehicle in the adjacent zone 30 may be determined, by processing image data captured by the one or more cameras, such as to reduce false threat determinations. That is, the system may monitor the adjacent zone 30 by processing the radar sensor data and only activate the SVS camera or begin processing captured image data when a threat is determined or confirmation is required.

When presence of the other vehicle is determined in the rear zone 32, the system 12 may determine whether the other vehicle is approaching the equipped vehicle and the system may determine or estimate the TTC of the approaching other vehicle, such as based on a determined relative speed and projected path of travel of the approaching vehicle. For example, the system may determine the TTC or other qualities of the approaching vehicle utilizing characteristics of the systems described in U.S. Publication No. US-2023-0032998, which is hereby incorporated herein by reference in its entirety.

The TTC may be an estimated time to collision between the equipped vehicle and the approaching vehicle if the equipped vehicle were to change lanes or move laterally toward the rear zone 32 and the other vehicle. When the TTC associated with the approaching vehicle is less than a threshold TTC (e.g., 3.5 seconds or less), then the approaching vehicle may be identified as a threat. In other words, the degree of collision risk may be determined to be above the threshold collision risk when the TTC is below a threshold TTC. The TTC associated with the detected vehicle may be determined via processing of the sensor data captured by the radar sensors and/or the image data captured by the SVS cameras.

If the detected vehicle in the rear zone 32 is not approaching the equipped vehicle or if the TTC is above the threshold TTC, the other vehicle may not be identified as a threat (until or unless the vehicle enters the adjacent zone 30 or the TTC falls below the threshold). The system may determine presence of the vehicle in the rear zone 32 via processing of radar sensor data and/or image data. For example, image data may only be processed to confirm presence or provide more precise location and/or travel data of the other vehicle.

Optionally, the system 12 may predict that a vehicle is present in the adjacent zone 30 using radar sensor data and may, responsive to determining presence of the other vehicle, capture image data via the SVS camera(s) and process the captured image data to verify the prediction. For example, the system may initially determine presence of the other vehicle via processing of radar sensor data and the other vehicle may move into the blind spot of the vehicle radar sensors. Responsive to losing sight of the other vehicle (e.g., failing to determine presence of the other vehicle using radar sensor data), the system may capture image data via the SVS camera(s) and process the captured image data to determine presence of the vehicle in the radar blind spot. Thus, the system may predict presence of the other vehicle via processing of radar sensor data and, after confirming presence of the other vehicle via processing of image data, determine that the other vehicle is a threat.

That is, to detect objects or vehicles approaching from behind the equipped vehicle in the adjacent lane, the system uses information from rear corner radars and surround view cameras. Radar sensors may provide object information, such as longitudinal distance, lateral distance, and relative velocity of the object with respect to the equipped vehicle. Surround view cameras may be used to provide additional coverage, such as to detect object when they enter the blind zone of the rear corner radar sensors or to confirm or supplement determinations made using the radar sensors. Processing of surround view camera image data may provide similar information related to the objects as the radar sensor data, such as longitudinal distance and lateral distance relative to the equipped vehicle. Surround view cameras may be mounted in the body of the vehicle such as at side mirrors or pillars to monitor the environment in the adjacent zone 30 and surround view cameras may view several meters (e.g., 20 meters or more) of longitudinal distance (i.e., along a longitudinal axis in a direction of movement of the vehicle) and a few meters (e.g., 3 meters or more or 4 meters or more) of lateral distance (i.e., laterally from the side of the vehicle) to report detected vehicle objects.

Combining the information acquired via processing sensor data captured by radar sensors and image data captured by surround view cameras, the system 12 detects if there are objects present in the adjacent zones 30 and predicts if the object may potentially collide with the equipped vehicle if the equipped vehicle changes lanes in the future. Additional information from the sensors or other vehicle systems, such as heading angle of the other vehicle, relative velocity of the other vehicle, type of detected object, and the like can be used to minimize false alerts.

When the other vehicle is determined to be a threat to the equipped vehicle (i.e., the determined degree of collision risk is greater than a threshold risk), the system 12 may communicate a signal to the driver of the vehicle 10 and the system may communicate increasing alerts or perform a driving maneuver based on a determined level of the threat posed by the other vehicle. For example, the system 12 may issue a visual alert, such as by illuminating an icon or indicator light at the gauge cluster or exterior rearview mirror corresponding to the side of the vehicle at which the threat is present. Additional alerts (e.g., flashing visual alert, audio alert, and the like) may be generated when the driver expresses the intention to change lanes in the direction of where the threat is present, such as by using the turn signal lever. Alerts and/or a corrective driving maneuver may be applied when the system determines presence of the threat and movement of the vehicle toward the adjacent lane or threat. For example, a lateral motion correction (via steering and/or brake actuation) may be applied to the vehicle to avoid potential collisions. Movement of the equipped vehicle toward the adjacent lane and/or determined threat and/or potential collisions due to vehicle lateral motion can be detected through vehicle signals (yaw rate, steering angle, steering torque, and the like) and/or the front camera module lane mark output indicating proximity of the vehicle to lane marks (i.e., lines designating the boundaries of a traffic lane in which the vehicle is currently travelling).

Thus, a visual alert, such as warning lights at the exterior side view mirrors, may be issued when there is an object detected in the adjacent zone 30 of the equipped vehicle, or a fast-approaching object from behind the equipped vehicle in the adjacent traffic lane that has a TTC below the threshold time. In other words, a blind spot indicator light may illuminate even when a vehicle is not currently present in the blind spot of the vehicle if a vehicle is approaching the blind spot and has a TTC below the threshold. In addition to or instead of the visual alert, an audible alert may then be generated if the driver activates the turn signal indicator of the same side where the threat is detected. In addition to or instead of the visual and audible alerts, the system 12 may perform a corrective driving maneuver if the current path of travel of the vehicle is moving toward the other vehicle or would be likely to cause a collision with the other vehicle.

When performing the corrective driving maneuver, the system 12 may adjust control of the steering, acceleration, and/or braking of the equipped vehicle to avoid or mitigate collision and/or reduce the chance of collision with the detected object or other vehicle. That is, when the determined risk of collision is greater than the threshold risk of collision, the system 12 may adjust control of the vehicle to adjust the current path of travel of the vehicle such that the risk of collision is below the threshold risk of collision. For example, the system may adjust control of the vehicle to increase the TTC or increase the proximity of the detected object or vehicle to the equipped vehicle.

Figure 4:
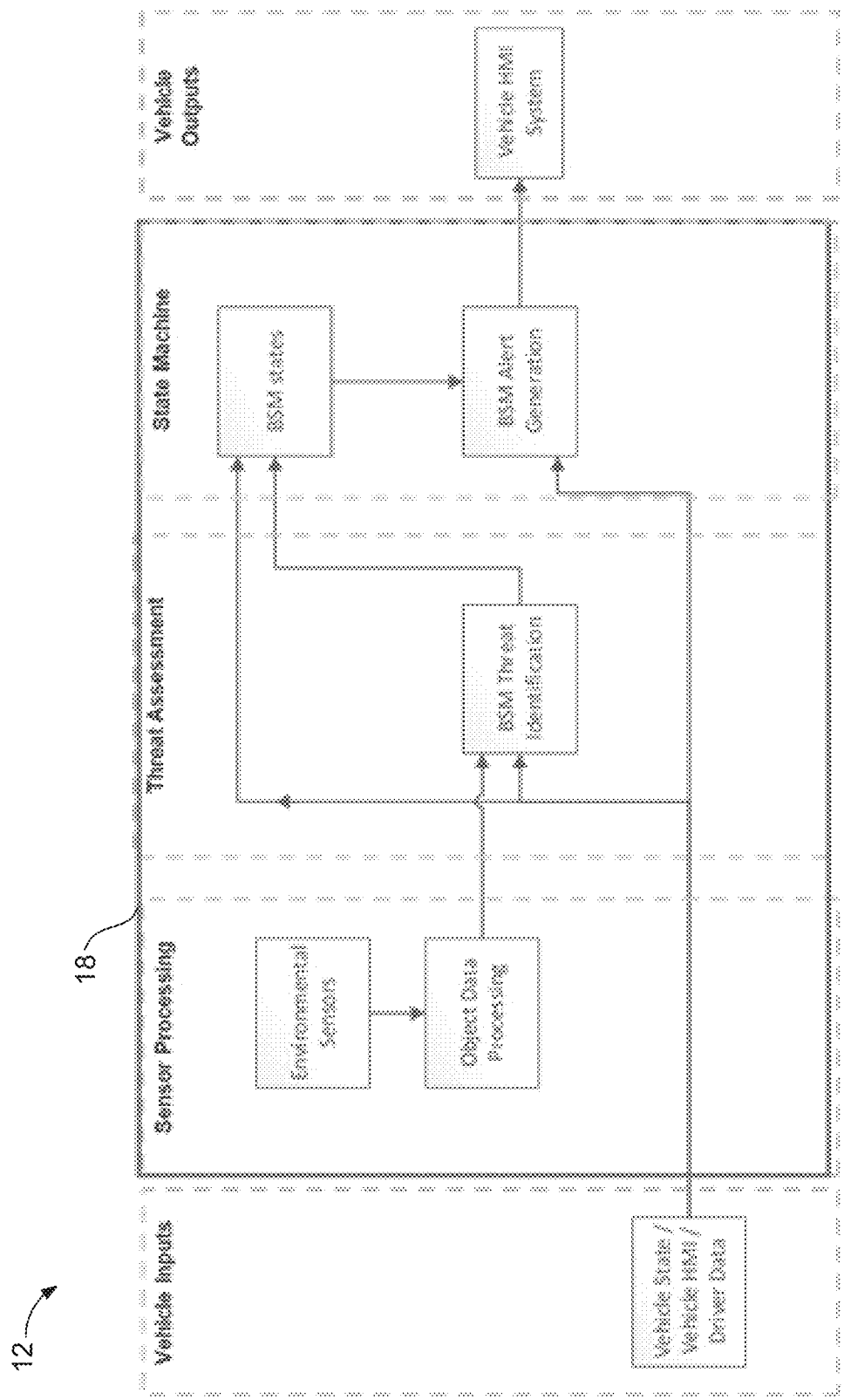
FIG. 4 is a schematic view of the alert system processing sensor data to determine threats and issue a warning signal to the driver of the vehicle based on the determined threat.

FIG. 4 is a schematic view of the system 12 (e.g., the ECU 18) that receives sensor data from the vehicle sensors (e.g., the radar sensors and/or surround view cameras), and determines presence of a threat in a traffic lane adjacent the vehicle. The system 12 communicates an alert or display output to the driver of the vehicle based on the threat. As shown, vehicle inputs provide signals related to the current state of the equipped vehicle and driver interventions, such as vehicle gear information, turn indicator position, and the like. Sensor data provided by the rear corner radar sensors and the surround view camera system is processed to determine information about detected objects rearward and sideward of the equipped vehicle, such as object classification (e.g., vehicle, bicycle, motorcycle, and the like), object distance, object relative velocity, object motion status, and the like. Based on the sensor data and the determined object information, the system 12 determines whether a detected object is a threat or not.

A detected object may be determined to be a threat based on object position (e.g., how close the object is to the adjacent zone 30 or whether the object is in the adjacent zone 30 or the rear zone 32) and object relative velocity (e.g., if the object is in the rear zone 32 and has a TTC below the threshold), and the like. For example, the system may determine whether the lateral and longitudinal distances of the determined object place the object within the adjacent zone 30 or the rear zone 32 of the vehicle. If the object is reported by corner radar sensor data as detected inside the adjacent zone 30, the object is identified as a threat. If the object is reported by the corner radar sensors as predicted inside the adjacent zone 30, object detection information from the surround view cameras may be used to crosscheck the presence of such an object. If the surround view camera image data confirms the vehicle present in the adjacent zone 30, the threat may be identified. If the object is reported by corner radar sensor data as detected inside the rear zone 32, the system checks whether the TTC of the object is below the threshold and identifies the object as a threat when the TTC is below the threshold.

When a detected object is determined to be a threat, and based on the sensor data and determined object information and environmental conditions, the system 12 generates an appropriate alert. Visual alerts and audible alerts may be presented to the driver via an appropriate display or human machine interface (HMI), such providing visual alerts at the infotainment screen, gauge cluster, or interior rearview mirror assembly and providing audio alerts via one or more speakers of the vehicle.

Optionally, the system may perform additional checks prior to communicating the alert signal to minimize false alerts. For example, a longitudinal velocity of the detected object may be determined to decide whether the detected object is a threat or not, such as to determine that the object is travelling away from the equipped vehicle and thus is likely in an adjacent traffic lane travelling in the opposite direction as the equipped vehicle (i.e., an oncoming traffic lane) and should not be identified as a threat. A lateral velocity of the detected object may be determined, such as to determine if the object is changing lanes (toward or away from the equipped vehicle). Furthermore, an object type of the detected object may be determined to filter out certain object types. Additionally, a yaw rate of the equipped vehicle may be considered to determine if a detected object is a threat when driving on curved roads.

To reduce unwanted alerts and obtain a continuous alert, hysteresis is added onto determined object distances and velocities. This helps in obtaining a continuous alert in cases where the determined values associated with the detected object (e.g., proximity of the object to the equipped vehicle, relative velocity of the object to the equipped vehicle and the like) fluctuate at or near threshold values. Further, the system may turn on and turn off delays (i.e., hysteresis) to prevent false alerts due to sudden increases or decreases in the determined values associated with the detected object. For example, if the system registers a spike in the relative velocity of the detected object that results in the TTC associated with the detected object to be below the threshold, the system may delay issuing the alert until additional sensor data is captured that confirms or refutes the spike.

Optionally, the adjacent and rear zones (i.e., the areas surrounding the vehicle where presence of an object may be identified as a threat) may be configured to correspond to traffic lanes adjacent the traffic lane in which the equipped vehicle is travelling. Further, the system may only determine presence of objects in traffic lanes travelling in the same direction as the equipped vehicle. Thus, for example, the system may not be triggered by an object present more than one lane away from the equipped vehicle or by an object present in an oncoming traffic lane. However, if an object more than one lane away from the equipped vehicle moves laterally into the adjacent or rear zone, the system may determine whether such an object is a threat. Therefore, the system may determine threats when a vehicle changes lanes toward the lane adjacent the equipped vehicle and identify merging traffic.

Optionally, the system may distinguish between detected objects in driver side and passenger side adjacent zones and rear zones and adjust threshold levels (e.g., threshold proximity or threshold TTC for threat determination, or threshold risk of collision for determination to generate an alert) based on the side at which the object is detected. For example, another vehicle may be more likely to approach the equipped vehicle in a driver side traffic lane than a passenger side traffic lane and thus the threshold TTC for vehicles detected in the driver side rear zone may be greater to capture more threats approaching along the driver side.

Thus, the system uses multiple sensors to determine presence of threatening objects in a blind zone region of the driver. The system fuses object detection of radar sensors and surround view system side cameras to determine the presence of and degree of threats. Optionally, the system may further process sensor data captured by one or more ultrasonic sensors at the vehicle to determine presence of objects or other vehicles at or near the adjacent zone or rear zone of the equipped vehicle. When the other vehicle is detected at or near the adjacent zone or rear zone of the equipped vehicle (or predicted to be at or near one of the zones), the system determines whether the detected vehicle is a threat to the equipped vehicle. For example, the detected vehicle may be determined to be a threat when the proximity of the detected vehicle to the equipped vehicle is below a threshold proximity or a TTC between the detected vehicle and the equipped vehicle is below a threshold TTC. Optionally, the system determines that the detected vehicle is a threat based on a lateral velocity and/or a longitudinal velocity being greater than a threshold velocity. Optionally, the threshold for determining whether the detected vehicle is a threat is adjustable, such as based on a yaw rate of the equipped vehicle (e.g., the threshold proximity is reduced when the equipped vehicle is travelling on curved roads). Optionally, object classification may cause the system to filter out unrelated objects (e.g., stationary or non-moving objects like buildings along the side of the road). When a detected object is determined to be a threat, the ADAS may perform a corrective driving maneuver, such as by controlling the steering system or brake system of the vehicle to avoid potential collision with the detected vehicle. The potential for collision may be determined based on sensor readings of the equipped vehicle, such as determined yaw rate, steering angle, steering torque and the like, and captured sensor data of the detected vehicle. Further, the potential collision may be determined based on lane marker information captured by the surround view cameras, a front camera module and the like.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077;

US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in U.S. Pat. Nos. 10,071,687; 9,900,522; 9,834,153; 9,762,880; 9,596,387; 9,264,672; 9,126,525 and/or 9,041,806, and/or U.S. Publication No. US-2015-0022664, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, the vehicular driving assist system comprising:
a plurality of radar sensors disposed at a vehicle equipped with the vehicular driving assist system, the plurality of radar sensors capturing sensor data;
wherein the plurality of radar sensors include at least (i) a driver-side radar sensor that senses at least rearward of the vehicle and sideward of the vehicle at a driver side of the vehicle and (ii) a passenger-side radar sensor that senses at least rearward of the vehicle and sideward of the vehicle at a passenger side of the vehicle;
a plurality of cameras disposed at the vehicle, the plurality of cameras capturing image data;
wherein the plurality of cameras are part of a surround view vision system of the vehicle, and wherein the plurality of cameras include at least (i) a driver-side sideward viewing camera that views at least sideward of the vehicle at the driver side of the vehicle, (ii) a passenger-side sideward viewing camera that views at least sideward of the vehicle at the passenger side of the vehicle, and (iii) a rearward viewing camera that views at least rearward of the vehicle;
wherein each camera of the plurality of cameras comprises a CMOS imaging array having at least one million photosensors arranged in rows and columns;
an electronic control unit (ECU) comprising electronic circuitry and associated software;
wherein the electronic circuitry of the ECU comprises at least one data processor for processing sensor data captured by the plurality of radar sensors and for processing image data captured by the plurality of cameras;
wherein the vehicular driving assist system, when the vehicle is travelling along a path of travel and responsive to processing at the ECU of sensor data captured by the plurality of radar sensors, is operable to determine presence of an object that is in one selected from the group consisting of (i) an adjacent zone and (ii) a rear zone;
wherein the adjacent zone extends a first distance rearward of the vehicle and along one selected from the group consisting of (a) the driver side of the vehicle and (b) the passenger side of the vehicle, and wherein the rear zone extends a second distance rearward of the vehicle and at least partially rearward of the adjacent zone, and wherein the second distance is greater than the first distance;
wherein the vehicular driving assist system, responsive to determining presence of the object, and via processing at the ECU of image data captured by at least one camera of the plurality of cameras, confirms presence of the object;
wherein the vehicular driving assist system, responsive to confirming presence of the object in the adjacent zone, determines a degree of collision risk based on proximity of the object to the vehicle; and
wherein the vehicular driving assist system, responsive to confirming presence of the object in the rear zone, estimates a time to collision (TTC) of the object to the vehicle and determines the degree of collision risk based on the estimated TTC.

2. The vehicular driving assist system of claim 1, wherein the vehicular driving assist system determines that the degree of collision risk is above a threshold collision risk by determining that the determined proximity of the object to the vehicle is below a threshold distance.

3. The vehicular driving assist system of claim 1, wherein the vehicular driving assist system determines that the degree of collision risk is above a threshold collision risk by determining that the determined TTC is below a threshold TTC.

4. The vehicular driving assist system of claim 3, wherein the threshold TTC is less than or equal to 3.5 seconds.

5. The vehicular driving assist system of claim 1, wherein the adjacent zone extends for the first distance rearward of the vehicle from a B-pillar of the vehicle.

6. The vehicular driving assist system of claim 5, wherein the first distance is less than or equal to 6 meters.

7. The vehicular driving assist system of claim 1, wherein the rear zone extends for the second distance rearward of the vehicle from a rear bumper of the vehicle.

8. The vehicular driving assist system of claim 7, wherein the second distance is greater than or equal to 20 meters.

9. The vehicular driving assist system of claim 1, wherein the adjacent zone and the rear zone at least partially overlap.

10. The vehicular driving assist system of claim 1, wherein the vehicular driving assist system, responsive to determining that the determined degree of collision risk is above a threshold collision risk, alerts a driver of the vehicle.

11. The vehicular driving assist system of claim 10, wherein the vehicular driving assist system alerts the driver via an illuminated visual alert signal or an audible alert tone.

12. The vehicular driving assist system of claim 1, wherein the vehicular driving assist system, responsive to determining that the determined degree of collision risk is above a threshold collision risk, controls the vehicle to mitigate collision with the object.

13. The vehicular driving assist system of claim 12, wherein the vehicular driving assist system controls the vehicle to mitigate collision with the object by at least one selected from the group consisting of (i) controlling braking of the vehicle to reduce a speed of the vehicle, (ii) controlling steering of the vehicle and (iii) controlling acceleration of the vehicle to increase the speed of the vehicle.

14. The vehicular driving assist system of claim 1, wherein the vehicular driving assist system, responsive to determining that the degree of collision risk is above a threshold collision risk and responsive to receiving a lane change indication toward the object, controls steering of the vehicle to mitigate collision with the object.

15. The vehicular driving assist system of claim 14, wherein the lane change indication comprises an indication that a driver of the vehicle has activated a turn signal indicator indicating intent to maneuver the vehicle toward the object.

16. The vehicular driving assist system of claim 14, wherein the lane change indication comprises a determination that the vehicle is moving laterally toward the object.

17. The vehicular driving assist system of claim 1, wherein the driver-side radar sensor is disposed at a rear driver-side corner region of the vehicle, and wherein the passenger-side radar sensor is disposed at a rear passenger-side corner region of the vehicle.

18. The vehicular driving assist system of claim 1, wherein the plurality of radar sensors further includes (i) a second driver-side radar sensor that senses at least forward of the vehicle and sideward of the vehicle at the driver side of the vehicle and (ii) a second passenger-side radar sensor that senses at least forward of the vehicle and sideward of the vehicle at the passenger side of the vehicle.

19. The vehicular driving assist system of claim 18, wherein the second driver-side radar sensor is disposed at a front driver-side corner region of the vehicle, and wherein the second passenger-side radar sensor is disposed at a front passenger-side corner region of the vehicle.

20. The vehicular driving assist system of claim 1, wherein the driver-side sideward viewing camera views at least sideward of the vehicle at the driver side of the vehicle and rearward of the vehicle, and wherein the passenger-side sideward viewing camera views at least sideward of the vehicle at the passenger side of the vehicle and rearward of the vehicle.

21. A vehicular driving assist system, the vehicular driving assist system comprising:
a plurality of radar sensors disposed at a vehicle equipped with the vehicular driving assist system, the plurality of radar sensors capturing sensor data;
wherein the plurality of radar sensors include at least (i) a driver-side radar sensor that senses at least rearward of the vehicle and sideward of the vehicle at a driver side of the vehicle and (ii) a passenger-side radar sensor that senses at least rearward of the vehicle and sideward of the vehicle at a passenger side of the vehicle;
a plurality of cameras disposed at the vehicle, the plurality of cameras capturing image data;
wherein the plurality of cameras are part of a surround view vision system of the vehicle, and wherein the plurality of cameras include at least (i) a driver-side sideward viewing camera that views at least sideward of the vehicle at the driver side of the vehicle, (ii) a passenger-side sideward viewing camera that views at least sideward of the vehicle at the passenger side of the vehicle, and (iii) a rearward viewing camera that views at least rearward of the vehicle;
wherein each camera of the plurality of cameras comprises a CMOS imaging array having at least one million photosensors arranged in rows and columns;
an electronic control unit (ECU) comprising electronic circuitry and associated software;
wherein the electronic circuitry of the ECU comprises at least one data processor for processing sensor data captured by the plurality of radar sensors and for processing image data captured by the plurality of cameras;
wherein the vehicular driving assist system, when the vehicle is travelling along a path of travel and responsive to processing at the ECU of sensor data captured by the plurality of radar sensors, is operable to determine presence of an object that is in one selected from the group consisting of (i) an adjacent zone and (ii) a rear zone;
wherein the adjacent zone extends a first distance rearward of the vehicle and along one selected from the group consisting of (a) the driver side of the vehicle and (b) the passenger side of the vehicle, and wherein the rear zone extends a second distance rearward of the vehicle and at least partially rearward of the adjacent zone, and wherein the second distance is greater than the first distance;
wherein the vehicular driving assist system, responsive to determining presence of the object, and via processing at the ECU of image data captured by at least one camera of the plurality of cameras, confirms presence of the object;
wherein the vehicular driving assist system, responsive to confirming presence of the object in the adjacent zone, determines a degree of collision risk based on proximity of the object to the vehicle;
wherein the vehicular driving assist system, responsive to confirming presence of the object in the rear zone, estimates a time to collision (TTC) of the object to the vehicle and determines the degree of collision risk based on the estimated TTC;
wherein, responsive to confirming presence of the object in the adjacent zone, the vehicular driving assist system determines that the degree of collision risk is above a threshold collision risk by determining that the determined proximity of the object to the vehicle is below a threshold distance; and wherein, responsive to confirming presence of the object in the rear zone, the vehicular driving assist system determines that the degree of collision risk is above the threshold collision risk by determining that the determined TTC is below a threshold TTC.

22. The vehicular driving assist system of claim 21, wherein the adjacent zone extends for the first distance rearward of the vehicle from a B-pillar region of the vehicle.

23. The vehicular driving assist system of claim 21, wherein the rear zone extends for the second distance rearward of the vehicle from a rear bumper region of the vehicle.

24. The vehicular driving assist system of claim 21, wherein the adjacent zone and the rear zone at least partially overlap.

25. The vehicular driving assist system of claim 21, wherein the vehicular driving assist system, responsive to determining that the determined degree of collision risk is above the threshold collision risk, alerts a driver of the vehicle.

26. The vehicular driving assist system of claim 25, wherein the vehicular driving assist system alerts the driver via an illuminated visual alert signal or an audible alert tone.

27. The vehicular driving assist system of claim 21, wherein the vehicular driving assist system, responsive to determining that the determined degree of collision risk is above the threshold collision risk, controls the vehicle to mitigate collision with the object.

28. The vehicular driving assist system of claim 27, wherein the vehicular driving assist system controls the vehicle to mitigate collision with the object by at least one selected from the group consisting of (i) controlling braking of the vehicle to reduce a speed of the vehicle, (ii) controlling steering of the vehicle and (iii) controlling acceleration of the vehicle to increase the speed of the vehicle.

29. A vehicular driving assist system, the vehicular driving assist system comprising:
a plurality of radar sensors disposed at a vehicle equipped with the vehicular driving assist system, the plurality of radar sensors capturing sensor data;
wherein the plurality of radar sensors include at least (i) a driver-side radar sensor that senses at least rearward of the equipped vehicle and sideward of the equipped vehicle at a driver side of the equipped vehicle and (ii) a passenger-side radar sensor that senses at least rearward of the equipped vehicle and sideward of the equipped vehicle at a passenger side of the equipped vehicle;
a plurality of cameras disposed at the equipped vehicle, the plurality of cameras capturing image data;
wherein the plurality of cameras are part of a surround view vision system of the equipped vehicle, and wherein the plurality of cameras include at least (i) a driver-side sideward viewing camera that views at least sideward of the equipped vehicle at the driver side of the equipped vehicle, (ii) a passenger-side sideward viewing camera that views at least sideward of the equipped vehicle at the passenger side of the equipped vehicle, and (iii) a rearward viewing camera that views at least rearward of the equipped vehicle;
wherein each camera of the plurality of cameras comprises a CMOS imaging array having at least one million photosensors arranged in rows and columns;
an electronic control unit (ECU) comprising electronic circuitry and associated software;
wherein the electronic circuitry of the ECU comprises at least one data processor for processing sensor data captured by the plurality of radar sensors and for processing image data captured by the plurality of cameras;
wherein the vehicular driving assist system, when the equipped vehicle is travelling along a path of travel and responsive to processing at the ECU of sensor data captured by the plurality of radar sensors, is operable to determine presence of another vehicle that is in one selected from the group consisting of (i) an adjacent zone and (ii) a rear zone;
wherein the adjacent zone extends a first distance rearward of the equipped vehicle and along one selected from the group consisting of (a) the driver side of the equipped vehicle and (b) the passenger side of the equipped vehicle, and wherein the rear zone extends a second distance rearward of the equipped vehicle and at least partially rearward of the adjacent zone, and wherein the second distance is greater than the first distance;
wherein the rear zone extends for the second distance rearward of the equipped vehicle from a rear bumper of the equipped vehicle, and wherein the adjacent zone and the rear zone at least partially overlap;
wherein the vehicular driving assist system, responsive to determining presence of the other vehicle, and via processing at the ECU of image data captured by at least one camera of the plurality of cameras, confirms presence of the other vehicle;
wherein the vehicular driving assist system, responsive to confirming presence of the other vehicle in the adjacent zone, determines a degree of collision risk based on proximity of the other vehicle to the equipped vehicle; and
wherein the vehicular driving assist system, responsive to confirming presence of the other vehicle in the rear zone, estimates a time to collision (TTC) of the other vehicle to the equipped vehicle and determines the degree of collision risk based on the estimated TTC.

30. The vehicular driving assist system of claim 29, wherein the vehicular driving assist system determines that the degree of collision risk is above a threshold collision risk by determining that the determined proximity of the other vehicle to the equipped vehicle is below a threshold distance.

31. The vehicular driving assist system of claim 29, wherein the vehicular driving assist system determines that the degree of collision risk is above a threshold collision risk by determining that the determined TTC is below a threshold TTC.

32. The vehicular driving assist system of claim 29, wherein, the vehicular driving assist system responsive to determining that the determined degree of collision risk is above a threshold collision risk, alerts a driver of the equipped vehicle.

33. The vehicular driving assist system of claim 32, wherein the vehicular driving assist system alerts the driver via an illuminated visual alert signal or an audible alert tone.

34. The vehicular driving assist system of claim 29, wherein the vehicular driving assist system, responsive to determining that the determined degree of collision risk is above a threshold collision risk, controls the equipped vehicle to mitigate collision with the object.

35. The vehicular driving assist system of claim 34, wherein the vehicular driving assist system controls the equipped vehicle to mitigate collision with the object by at least one selected from the group consisting of (i) controlling braking of the equipped vehicle to reduce a speed of the equipped vehicle, (ii) controlling steering of the equipped vehicle and (iii) controlling acceleration of the equipped vehicle to increase the speed of the equipped vehicle.

* * * * *